(12) United States Patent
Loeb

(10) Patent No.: US 7,571,299 B2
(45) Date of Patent: Aug. 4, 2009

(54) METHODS AND ARRANGEMENTS FOR INSERTING VALUES IN HASH TABLES

(75) Inventor: Mitchell L. Loeb, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 355 days.

(21) Appl. No.: 11/355,672

(22) Filed: Feb. 16, 2006

(65) Prior Publication Data

US 2007/0192564 A1    Aug. 16, 2007

(51) Int. Cl.
  *G06F 12/00*  (2006.01)
(52) U.S. Cl. ............... 711/216; 711/200; 711/201; 711/217; 711/219; 707/1
(58) Field of Classification Search ............... None
  See application file for complete search history.

(56) References Cited

U.S. PATENT DOCUMENTS

| | | | |
|---|---|---|---|
| 6,086,626 A * | 7/2000 | Jain et al. ............... 716/5 |
| 6,115,802 A | 9/2000 | Tock et al. | |
| 6,292,795 B1 | 9/2001 | Peters et al. | |
| 6,804,767 B1 * | 10/2004 | Melvin ............... 711/216 |
| 6,915,296 B2 | 7/2005 | Parson | |
| 2004/0034656 A1 | 2/2004 | Beesley | |

(Continued)

FOREIGN PATENT DOCUMENTS

JP    2004145729 A    5/2004

OTHER PUBLICATIONS

Loudon, Kyle, Mastering Algorithms with C, 1999, O'Reilly, Chapter 8—Hash Tables.*

(Continued)

*Primary Examiner*—Kevin L Ellis
*Assistant Examiner*—Alan M Otto
(74) *Attorney, Agent, or Firm*—Cynthia G. Seal; Schubert Osterrieder & Nickelson PLLC

(57) ABSTRACT

Methods and arrangements to insert values in hash tables are contemplated. Embodiments include transformations, code, state machines or other logic to insert values in a hash table stored in electronic memory by hashing a value to determine a home address of an entry in the hash table, the hash table having a plurality of entries, each entry comprising an address, a value, and a link. The embodiments may include determining whether there is a collision of the value with a value stored in the entry; inserting the value in the entry if there is no collision; and generating the addresses of further entries until an entry is found in which the value can be inserted if there is a collision. The embodiments may include generating a plurality of addresses of entries based upon the address of a previously generated entry. In some embodiments, a plurality of addresses of entries may be generated from an address of an entry by changing single bits of the address of the entry and taking the resulting address modulus the table size. In further embodiments, the link from one entry to another in the hash table may consist of a representation of the position of the bit that was changed in the address of the entry. In further embodiments, the space required to store a link may be smaller than the space required to store an address of an entry.

18 Claims, 8 Drawing Sheets

U.S. PATENT DOCUMENTS

2004/0083347 A1* 4/2004 Parson ........................ 711/165

OTHER PUBLICATIONS

Faloutsos, Christos, Multiattribute Hashing Using Gray Codes, 1986, ACM, pp. 227-238.*

Constantine Halatsis and George Philokyprou, Pseudochaining in Hash Tables, Jul. 1978, Communications of the ACM, vol. 21, 554-557.*

* cited by examiner

| LOCATION | VALUE | LINK |
|---|---|---|
| 0000 (0) | 99 | 000 (0) |
| 0001 (1) |  | 000 (0) |
| 0010 (2) | 68 | 001 (1) |
| 0011 (3) | 13 | 000 (0) |
| 0100 (4) | 92 | 000 (0) |
| 0101 (5) |  | 000 (0) |
| 0110 (6) |  | 000 (0) |
| 0111 (7) |  | 000 (0) |
| 1000 (8) | 96 | 000 (0) |
| 1001 (9) | 75 | 000 (0) |
| 1010 (10) | 109 | 000 (0) |

| LOCATION | VALUE | LINK |
|---|---|---|
| 0000 (0) | 99 | 000 (0) |
| 0001 (1) |  | 000 (0) |
| 0010 (2) | 68 | 001 (1) |
| 0011 (3) | 13 | 000 (0) |
| 0100 (4) | 92 | 001 (1) |
| 0101 (5) | 81 | 000 (0) |
| 0110 (6) |  | 000 (0) |
| 0111 (7) |  | 000 (0) |
| 1000 (8) | 96 | 000 (0) |
| 1001 (9) | 75 | 000 (0) |
| 1010 (10) | 109 | 000 (0) |

| LOCATION | VALUE | LINK |
|---|---|---|
| 0000 (0) | 99 | 000 (0) |
| 0001 (1) | 24 | 000 (0) |
| 0010 (2) | 68 | 001 (1) |
| 0011 (3) | 13 | 010 (2) |
| 0100 (4) | 92 | 001 (1) |
| 0101 (5) | 81 | 000 (0) |
| 0110 (6) |  | 000 (0) |
| 0111 (7) |  | 000 (0) |
| 1000 (8) | 96 | 000 (0) |
| 1001 (9) | 75 | 000 (0) |
| 1010 (10) | 109 | 000 (0) |

| LOCATION | VALUE | LINK |
|---|---|---|
| 0000 (0) | 99 | 000 (0) |
| 0001 (1) | 24 | 000 (0) |
| 0010 (2) | 68 | 001 (1) |
| 0011 (3) | 13 | 010 (2) |
| 0100 (4) | 92 | 010 (2) |
| 0101 (5) | 60 | 000 (0) |
| 0110 (6) | 81 | 000 (0) |
| 0111 (7) |  | 000 (0) |
| 1000 (8) | 96 | 000 (0) |
| 1001 (9) | 75 | 000 (0) |
| 1010 (10) | 109 | 000 (0) |

| LOCATION | VALUE | LINK |
|---|---|---|
| 0000 (0) | 99 | 001 (1) |
| 0001 (1) | 24 | 011 (3) |
| 0010 (2) | 68 | 001 (1) |
| 0011 (3) | 13 | 010 (2) |
| 0100 (4) | 92 | 001 (1) |
| 0101 (5) | 81 | 010 (2) |
| 0110 (6) |  | 000 (0) |
| 0111 (7) | 33 | 000 (0) |
| 1000 (8) | 96 | 000 (0) |
| 1001 (9) | 75 | 000 (0) |
| 1010 (10) | 109 | 000 (0) |

METHODS AND ARRANGEMENTS FOR INSERTING VALUES IN HASH TABLES

FIELD

The present invention is in the field of data storage and retrieval systems. More particularly, the present invention relates to methods and arrangements for inserting values in hash tables.

BACKGROUND

Storing records in a data table and retrieving the records are common tasks. Various data structures, table organizations, and access techniques have been utilized to determine a location for storing an element of data and to determine the location in which an element of data has been stored. In general, the data may be stored in a table of records or elements, where each element has a collection of fields associated with it. In the table, each field is associated with one of a number of attributes that, together, make up the element. One of the attributes is the "key" that refers to the element and on which the searching is based. Various techniques for organizing a table include lists, binary search trees, digital search trees and hash tables.

A serial or linear search algorithm searches through the data table one slot at a time until an available slot is discovered. Thus, starting at the beginning of the table, each slot is examined until an empty slot is found. Of course, this may be very time consuming if the next available slot for a 1,000-location data table is 600 slots away, since 599 slots will have to be checked before an available slot is found.

In hash tables, an element is stored in a table location that is computed directly from the key of the element. That is, the key is provided as an input to a hash function, h, which transforms the key into an index into the table. That address is known as the home address of the value. For example, a data base may contain 50 records of people with social security numbers as the key or ID number. A hash function which maps the keys onto a hash table of 100 elements is:

$$h\ (social\_security\_number) = social\_Security\_number\ mod\ 100$$

That is, the hash function of a social security number is the rightmost two digits of the number. For example, h (123456789)=89.

If the location of the table addressed by the index (represented here as h[key]) is empty, then the element may be stored there. In the ideal situation every key, when hashed, produces a unique index. This situation, known as perfect hashing, is very difficult to achieve unless a data table designer knows beforehand details of the records to be stored or the hash table size is large with respect to the number of data elements to be stored. Often, however, two or more records may hash to the identical physical location, the records' home address in the data table. This is known as a collision. In the above example, a collision would occur if a second social security number were 765432189. Both keys would hash to 89. When a collision occurs among a group of records, the records may be stored in a chain joined together by links. A first record may be stored at the home address, along with a link to the address of the second record. A link stored with the second record may point to a third record, and so on. These linked records represent what is known as a chain. A mechanism is needed to relocate colliding records to available slots in the data table and to link pieces of the chain together.

Although there are a number of methods that attempt to relocate records of a particular chain and link the records together, the methods have drawbacks. One method of measuring the effectiveness of these methods is to compare how many probes (a probe is a physical access of a location in the data table) are needed on average in order to retrieve each record once. For example, a chain of three records that are linked in a simple way so that each probe also identifies the exact location of the next record in the chain would require one probe for the first record, two probes for the second record (a stop at the first record before going to the second) and three probes for the third record. This provides an average of two probes (6 probes/3 records) to reach each record once. Current methods of hashing may produce long chains. When a collision is detected, these methods may examine only one other location for insertion of one of the colliding records, placing a link from the current location to the other location. If the hash table is relatively full, these methods may create a long chain before finding an empty location.

Another way to compare hashing methods is to examine the amount of extra storage that is required in a hash table in order to link the chains. Some methods may use the full address of a location in a table as a link. The links then require the same amount of storage as the addresses. As an example of storage for a link field, the table below has seven locations (0-6), and the links specify the entire address.

| Address | Value | Link |
|---------|-------|------|
| 000 (0) | 47    |      |
| 001 (1) | 23    | 011 (3) |
| 010 (2) |       |      |
| 011 (3) | 52    | 000 (0) |
| 100 (4) |       |      |
| 101 (5) |       |      |
| 110 (6) |       |      |

In the table above, three records were inserted in the following order: 23, 52 and 47. All three records are assumed to hash to the same home address of 1. The table shows that to access record 47, you must first examine location 1, the target home address for record 47, find that the record stored there is not a match for record 47, and then follow the link field (indicated by 3) to location 3. Again, the record there is not a match, and the link at location 3 is followed to location one, where a match is found. In general, the process of following links continues until a matching record is found or a blank for the link is found and a conclusion is made that this search was unsuccessful. In the case illustrated below, the extra storage for the link field is three bits since the link is the same size as the address. For a larger table with link size the same size as address size, many more bits would be needed for the link. Some tables may require 20 bits or more for addresses.

A third method of comparing hashing functions is to examine the ease of insertion of the new records into the data table. A method that relocates records in the chain away from their home addresses will cause those records to occupy positions in the table that can, in turn, be the home locations for other records. This can result in two or more chains being inter-linked, which is referred to as coalescing. Coalescing can cause the number of probes to increase, since a search would not only have to traverse a chain of records with common home addresses, but also the records of another chain that are interspersed with the first chain.

SUMMARY OF THE INVENTION

The problems identified above are in large part addressed by methods and arrangements to insert values in a hash table. One embodiment provides a method to insert values in a hash table stored in electronic memory. The hash table may have a plurality of entries, each entry comprising an address, a value, and a link. The method may involve hashing a value to determine a home address of an entry in the hash table and determining whether there is a collision of the value with a value stored in the entry. If there is no collision, the method may involve inserting the value in the entry. If there is a collision, the method may involve generating the addresses of further entries until an entry is found in which the value can be inserted. In generating the addresses of further entries, the method may involve generating a plurality of addresses of entries based upon the address of a previously generated entry.

Another embodiment provides an apparatus to insert values in a hash table with a plurality of entries, each entry comprising an address, a value, and a link. The apparatus may comprise a hashing module to hash a value to determine a home address of an entry in the hash table; an insertion module to determine whether there is a collision of the value with a value stored in the entry, to insert the value in the entry if there is no collision, and to insert the value in another entry if there is a collision; and an entry locator module to generate the addresses of further entries in the hash table until an entry is found in which the value can be inserted if there is a collision at the entry of the home address. The entry locator module may generate a plurality of addresses of entries based upon the address of a previously generated entry.

Another embodiment provides machine-accessible medium containing instructions to insert values in a hash table which when the instructions are executed by a machine, cause said machine to perform operations. The operations may involve hashing a value to determine a home address of an entry in the hash table and determining whether there is a collision of the value with a value stored in the entry. If there is no collision, the operations may involve inserting the value in the entry. If there is a collision, the operations may involve generating the addresses of further entries until an entry is found in which the value can be inserted. In generating the addresses of further entries, the operations may involve generating a plurality of addresses of entries based upon the address of a previously generated entry.

BRIEF DESCRIPTION OF THE DRAWINGS

Advantages of the invention will become apparent upon reading the following detailed description and upon reference to the accompanying drawings in which like references may indicate similar elements:

| FIG 1 | depicts an embodiment of a computer containing an application configured to implement hash tables; |
| --- | --- |
| FIG 2 | depicts an embodiment of a hash table manager; |
| FIG 3 | depicts a flowchart of an embodiment to insert values in a hash table; |
| FIG 4 | depicts an embodiment of a hash table its initialized state; |
| FIG 5 | depicts an embodiment of a hash table after the insertion of an initial value; |
| FIG 6 | depicts an embodiment of a hash table after the insertion of a second value; |
| FIG 7A | depicts an embodiment of a search tree for the insertion of a third value in a hash table; |
| FIG 7B | depicts an embodiment of a hash table after the insertion of a third value; |
| FIG 8 | depicts an embodiment of a hash table after the insertion of four more values; |
| FIG 9A | depicts an embodiment of a search tree for the insertion of an eighth value in a hash table; |
| FIG 9B | depicts an embodiment of a hash table after the insertion of an eighth value; |
| FIG 10A | depicts an embodiment of a search tree for the insertion of a ninth value in a hash table; |
| FIG 10B | depicts an embodiment of a hash table after the insertion of a ninth value; |
| FIG 11 | depicts an embodiment of a hash table after the insertion of a tenth value; |
| FIG 12A | depicts an embodiment of a search tree for the insertion of an alternative tenth value in a hash table; and |
| FIG 12B | depicts an embodiment of a hash table after the insertion of an alternative tenth value. |

DETAILED DESCRIPTION OF EMBODIMENTS

The following is a detailed description of embodiments of the invention depicted in the accompanying drawings. The embodiments are in such detail as to clearly communicate the invention. However, the amount of detail offered is not intended to limit the anticipated variations of embodiments, but on the contrary, the intention is to cover all modifications, equivalents, and alternatives falling within the spirit and scope of the present invention as defined by the appended claims. The detailed descriptions below are designed to make such embodiments obvious to a person of ordinary skill in the art.

Generally speaking, methods and arrangements to insert values in a hash table stored in electronic memory are contemplated. Embodiments include transformations, code, state machines or other logic to insert values in a hash table stored in electronic memory by hashing a value to determine a home address of an entry in the hash table, the hash table having a plurality of entries, each entry comprising an address, a value, and a link. The embodiments may include determining whether there is a collision of the value with a value stored in the entry; inserting the value in the entry if there is no collision; and generating the addresses of further entries until an entry is found in which the value can be inserted if there is a collision. The embodiments may include generating a plurality of addresses of entries based upon the address of a previously generated entry. In some embodiments, a plurality of addresses of entries may be generated from an address of an entry by changing single bits of the address of the entry and taking the resulting addresses modulus the table size. In further embodiments, the link from one entry to another in the hash table may consist of a representation of the position of the bit that was changed in the address of the entry to generate the address of the next entry. In further embodiments, the space required to store a link may be smaller than the space required to store an address of an entry.

While specific embodiments will be described below with reference to particular circuit or logic configurations, those of skill in the art will realize that embodiments of the present invention may advantageously be implemented with other substantially equivalent configurations.

Figure 1:
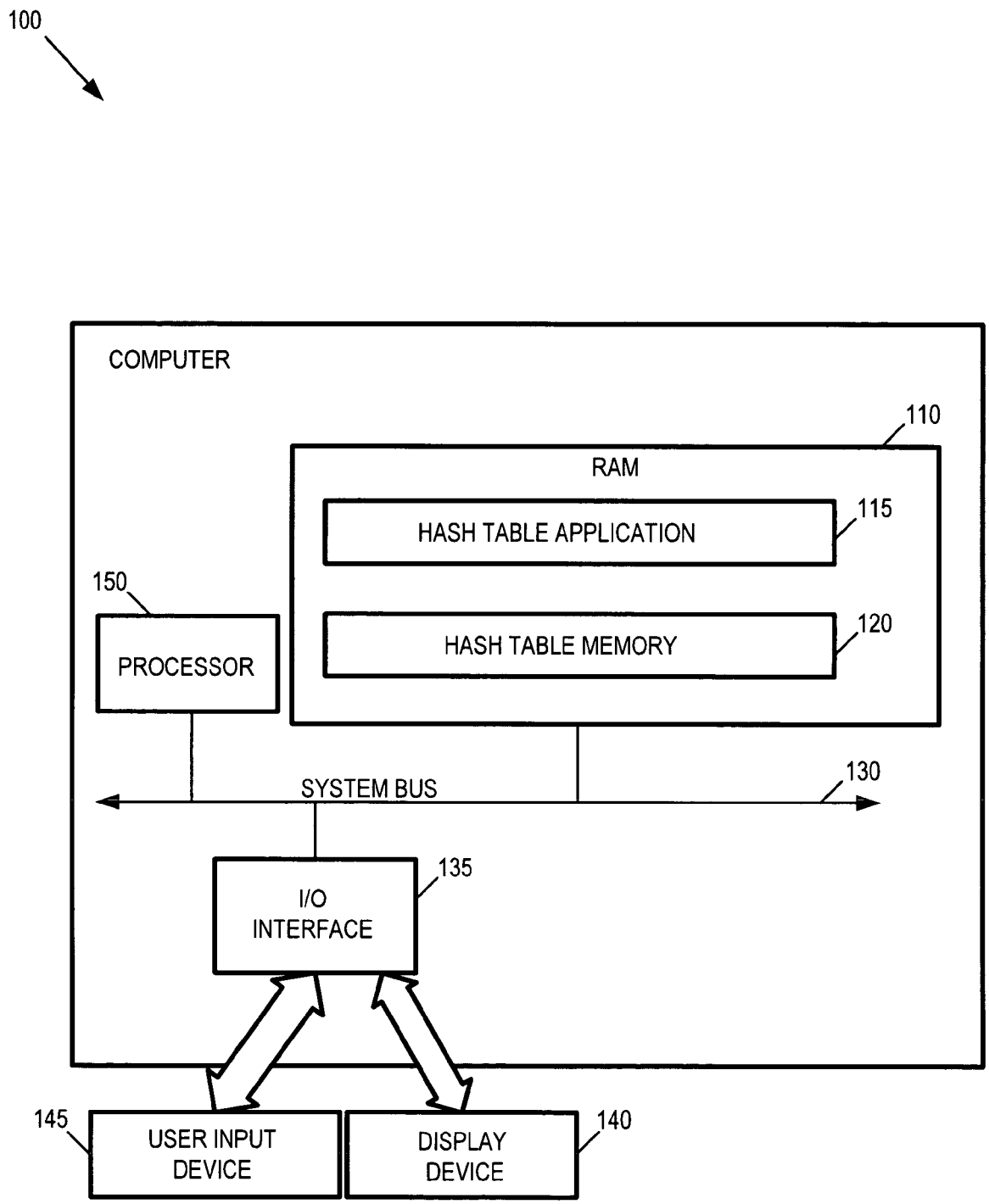

FIG. 1 depicts an embodiment of a computer 100 with a user input device 145 such as a mouse or keyboard and a display device 140 such as a monitor. Further embodiments may include other forms of user input such as voice commands, bar code scanners, text scanners, tablets, touch screens, and/or other forms of user input. Computer 100 includes random access memory (RAM) 110, an input/output (I/O) interface 135 and a processor 150 or CPU connected by system bus 130. I/O interface adapter 135 implements user-oriented I/O through, for example, software drivers and computer hardware for controlling output to display devices such as display device 140 as well as user input from user input device 145.

Stored in RAM 110 is a hash table application 115 and a hash table memory 120. Hash table application 115 is a computer program that maintains a hash table in hash table memory 120. Hash table application 115 may search for an entry in hash table memory 120 to store a value. Upon detecting a collision with the value stored at the entry, hash table application 115 may generate multiple additional entries to search based upon the address of the entry. Hash table application 115 and hash table memory 120 are shown as separate modules, but in some embodiments, hash table memory 120 may be part of the working memory of hash table application 115. Hash table application 115 is shown in RAM 110 in FIG. 1, but many components of such software may be stored in non-volatile memory also. In alternative embodiments, hash table memory 120 may be stored in a database or other storage device separate from the computer or computers running hash table application 115.

Figure 2:
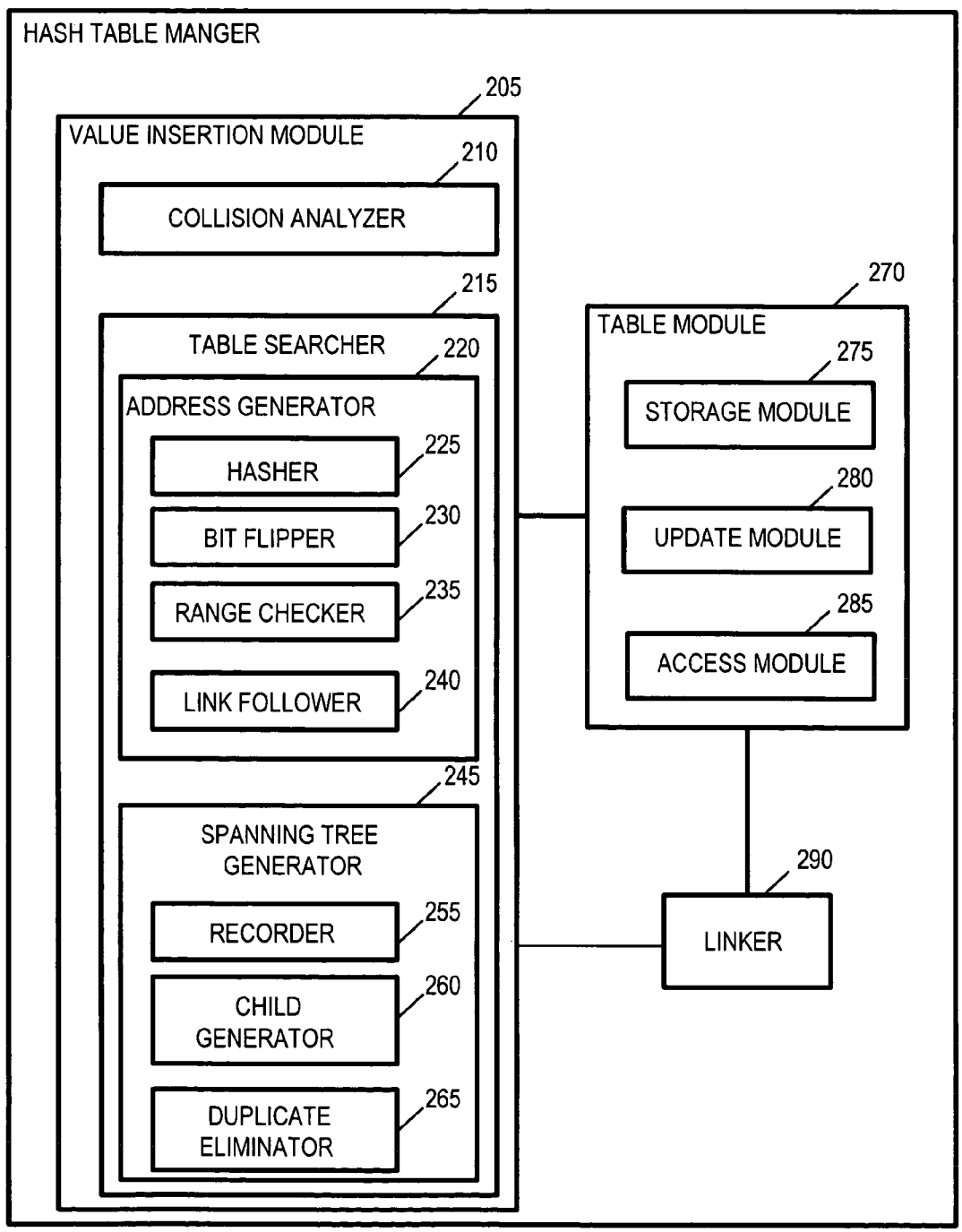

Turning to FIG 2, depicted is an embodiment of a hash table manager 200 that includes a value insertion module 205, a table module 270, and a linker 290. Table module 270 includes storage module 275, update module 280, and access module 285. Table module 270 may maintain storage for a hash table. Storage module 275 may include the memory for storing a hash table. The memory may be contained in RAM or in a separate storage device. In some embodiments, hash table manager 200 or other modules may perform a simulation to determine the number of entries to be held in a hash table. Update module 280 may modify the entries in a hash table. Update module 280 may insert or modify the values and links of entries in a hash table. Update module 280 may also initialize the values in a hash table. Access module 285 may locate an entry in a hash table when the address of the entry or a key to the entry is specified.

Value insertion module 205 finds suitable entries for storing values in a hash table. It includes collision analyzer 210 to detect collisions and table searcher 215 to search the hash table for a location to store a value. In a hash table, a hash function takes a key or value as input and produces as output an index or address into the hash table. The value is said to hash to the address, and the address is the home address of the value. If the entry at the home address is vacant, the key or value may be stored at the entry. The entry may, however, already contain a different value which also hashes to the address. In that case, a collision is said to occur. The value may then be stored in an entry at another address. Collision analyzer 210 may determine if an entry in the hash table stores a value. If the entry is vacant, the value may be stored there. Even if a value is already stored there, in some circumstances, the collision analyzer 210 may determine that the value may be stored in the entry. The stored value may be the same as the value to be stored. Alternatively, the location may be the home address of the value to be stored and the stored value may not be at its home address. In this case, the value may be stored at the home address and the stored value may be moved to an entry at another address.

Table searcher 215 includes address generator 220 to generate addresses of possible storage locations and spanning tree generator 245 to form a tree to represent the search of addresses in the hash table. Address generator 220 includes a hasher 225 to determine the home address of a value, bit flipper 230 to generate addresses differing from a given address by one bit in the binary representation, range checker 235 to check if an address generated by bit flipper 230 is within the range of the hash table, and link follower 240 to follow links to new addresses. Procedures for generating alternative addresses for location of a value in case of collision are critical to effective hash tables. In the embodiment of FIG. 2, address generator 220 may generate alternative addresses to explore for storage of values in case of collisions.

Spanning tree generator 245 includes recorder 255 to store the tree representing a search through the hash tree for a location in which to store a value, child generator 260 to generate child nodes representing locations that can be linked to already-searched locations, and duplicate eliminator 265 to eliminate newly-generated child nodes which have already been searched. When a value cannot be located at an entry represented by a parent node because of a collision, an address generator may generate an alternative address or addresses for examination. Child generator 260 may represent these alternative addresses as child nodes of the parent node. If an entry at one of these addresses represented by child nodes is vacant, the value may be stored at the entry. If, however, the value cannot be stored in the alternative addresses, alternatives to the alternatives may be generated, and so on. The tree structure produced by child generator 260 represents the repeated process of generating a new set of address of entries (child entries) from the previous set of entries (parent entries).

Linker 290 may record links from one entry to another in a chain of entries created by collisions. The link fields in a hash table may be used to indicate a path from the home address of a value to the entry where the value is stored. For example, in the hash table following paragraph 7 on page 3, the links at addresses 1 and 3 show the path to the entry containing value 47. In the example, all of the nodes hashed to 1 (had home address at 1). Value 52 was relocated to location 3, as indicated by the link at address 1. The link at location 3 points to address 0, the location of the entry storing value 47. Thus, the chain of links to value 47 is 1→3→0.

Linker 290 may record links by using fewer bits for the links than for the addresses of the nodes. For example, if the addresses of successive entries in a chain differ by only one bit in the binary representation of the addresses, then the linker 290 may record the link by indicating the position of the bit in which the addresses are different. This representation requires only $\log_2$ of the bits in the address. For example, in a hash table with 32 entries, five bits is sufficient to indicate an address. Links may be represented with 3 bits. A link from the entry with binary address 00001 (decimal 1) to the entry with binary address 10001 (decimal 17) may be indicated by binary 101 (decimal 5) because the two addresses differ by the bit in the fifth position of the address.

Figure 3:
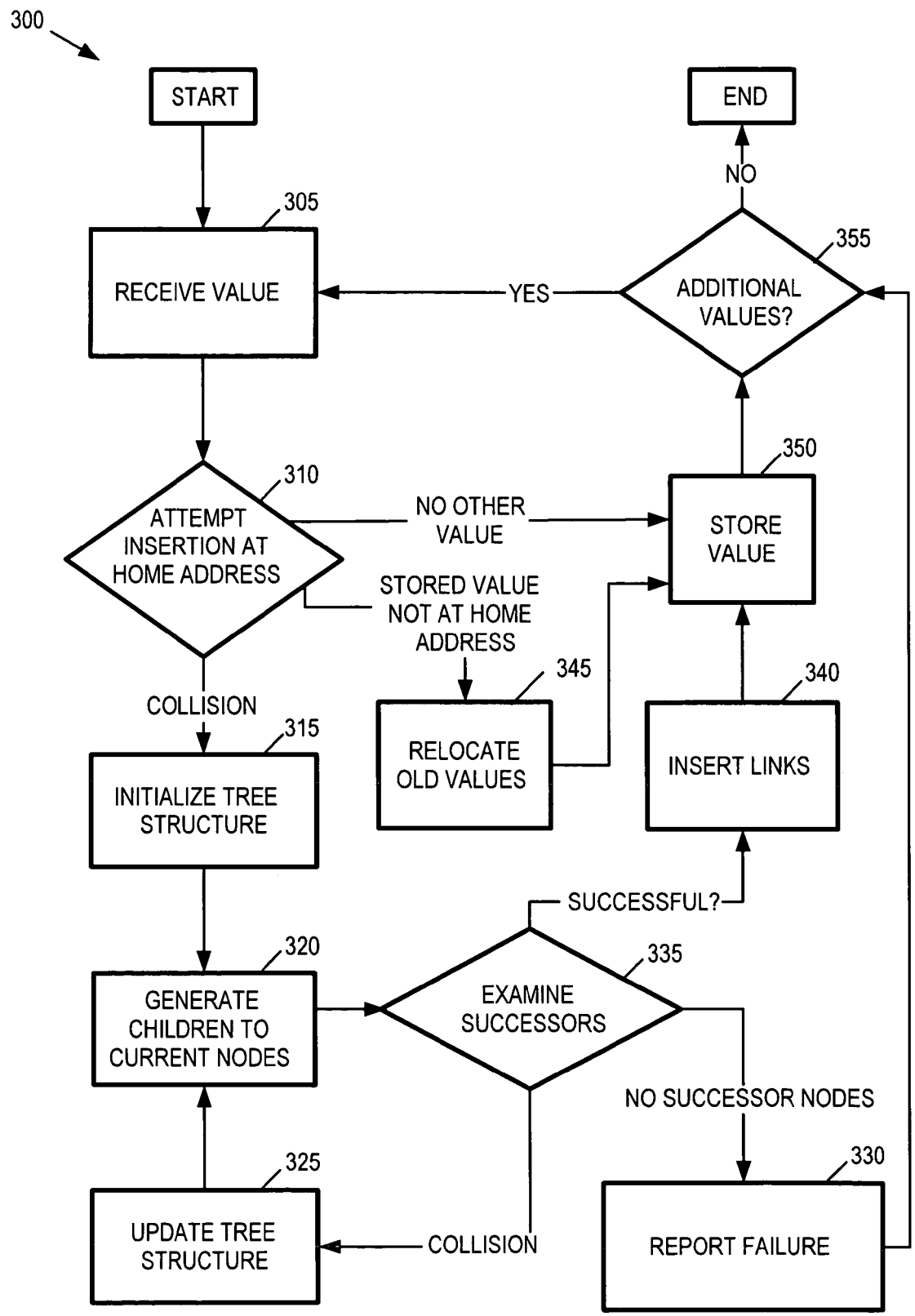

FIG 3 depicts a flowchart of an embodiment to insert an element in a hash table. In some embodiments, hash table manager 200 of FIG 2 or other modules may perform a simulation to determine the number of entries to be held in a hash table. Flow chart 300 begins with receiving a value to insert in a hash table (element 305). The value is then hashed to produce a home address in the table. A hash function is a mathematical function that takes values as input and produces addresses in the hash table as output. For example, if the value is a social security number and the table has size 100, then the hash function could return the last two digits of the social security number. That location of the hash table is then examined for insertion of the received value (element 310). If the location of the hash table contains no other value, that is, the location is vacant or already contains the received value, the received value is stored (element 350). The value is inserted at the location if the location does not already contain the value. If the hash table contains another value at the location, but the other value is not at its home address (the address to which a value hashes), then the stored value is relocated, along with any chain that may proceed from the stored value (element 345) and the received value is stored in the now vacant location in the hash table (element 350).

If, however, there is a collision, that is, the stored value is stored at the common home address of the two values, then the hash table may be searched to find another location to store the received value. The search may begin by initializing a tree structure to record the search (element 315). A tree consists of nodes connected with parent-child links. Nodes of the tree represent locations in the hash table. The root node represents the home address of the received value. Child nodes of a parent node represent hash tree locations reachable from the location represented by the parent node. An entry of a hash table may be reachable from another entry if the link field of the other entry points to the entry or if the method for searching the hash tree specifies that the entry should be searched after the other entry.

The search tree is then expanded by generating child nodes to the nodes currently being examined (element 320). Initially, the current node is a single node, representing the home address of the received value. The child entries in the hash table are then examined for the storage of the received value (element 335). The storage may be successful if a child entry is empty or already contains the received value. If so, links are inserted in the link fields of the elements of the hash table to represent the path from the home address of the received value to the location of storage (element 340) and the value is stored in the hash table (element 350). If, at step 320, no successor nodes were created, the attempt at storage has failed, and the hash table reports failure of the insertion of the received value (element 330). Otherwise, if collisions prevent the insertion of the received value in any of the newly-generated children entries, the search continues. The tree structure is updated (element 325) and new child nodes are generated (step 320).

Once the received value has been stored (element 350), if there are additional values to be stored (element 355), then the elements from 305 to 350 may be repeated. Otherwise, the storage of values may end.

Figure 4:
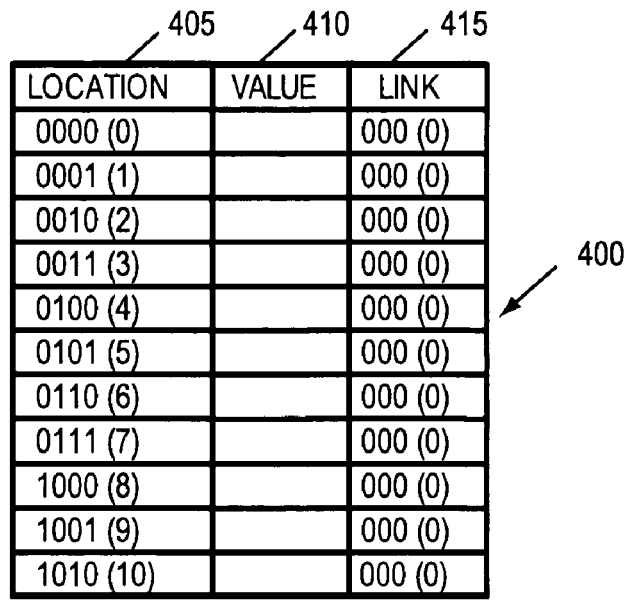

FIG. 4 through FIG. 11B represent successive stages in the insertion of values in an embodiment of a hash table 400. FIG. 4 depicts the initial state of an embodiment of a hash table 400. The rows of hash table 400 represent entries. Column 405 represents the location or address of an entry, shown both in binary and in decimal. The table contains 11 elements, with addresses 0 through 10. Column 410 represents the value stored in the entry. Initially, the hash table contains no values. Column 415 represents a link from the entry, both in binary and in decimal. A link value of zero represents a null link, that is, the absence of a link. Initially, there are no links. Successive figures represent successive stages in the insertion of values in hash table 400. In the figures, when a value cannot be inserted in an entry of the hash table, additional entries are examined by following links from the entry and by looking at addresses which differ from the address of the entry by one bit. When an entry for storing a value is found, links are inserted in hash table 400 to indicate the path from the home address of the value to the entry where it is stored. These links enable retrieval of the value.

Figure 5:
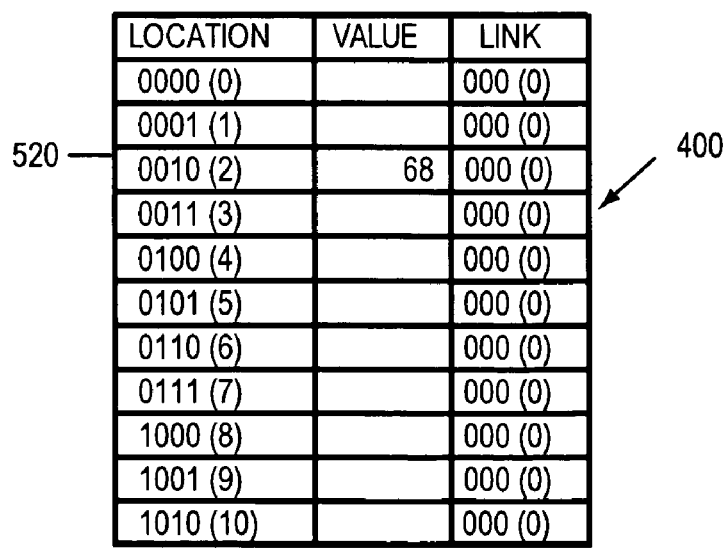
Figure 6:
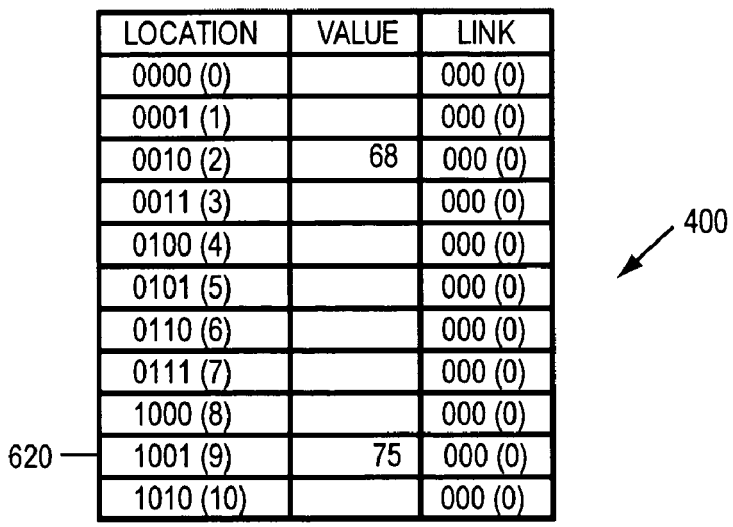

FIG. 5 represents the embodiment of a hash table 400 after the insertion of a single value, the value 68 at the entry (520) with address 2. In this embodiment, the hash function maps a value to the value mod 11 (the remainder after division by 11). Thus, value 68 maps to home address 2. Hash table 400 contains no other values in the value column and no links in the link column. Similarly, FIG. 6 represents the embodiment of a hash table 400 after insertion of a second value, 75 at entry (620) with address 9. The hash function maps 75 to address 9.

Figure 7A:
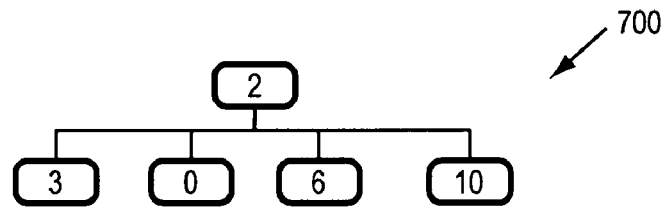
Figure 7B:
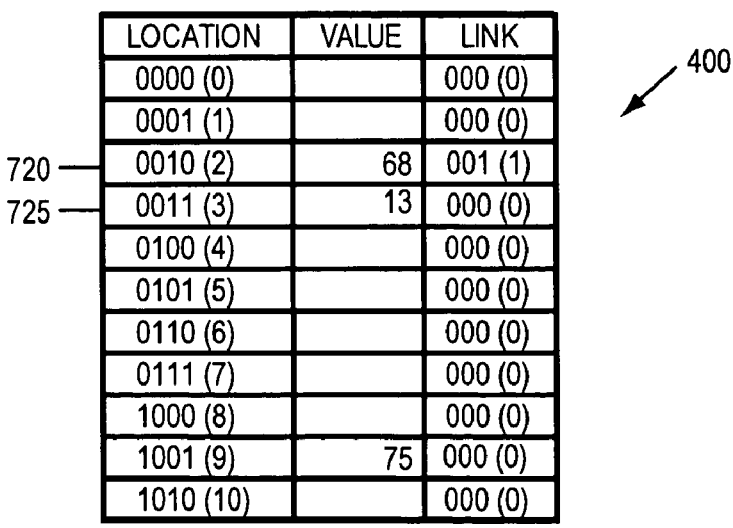

FIG. 7A and FIG. 7B represent the insertion of the value 13 in the embodiment of a hash table 400. FIG. 7A depicts an embodiment of a search tree 700 for the insertion of the value. The root node of the search tree represents the home address, 2, of the value. The hash function maps the value 13 to the address 2. As shown by FIG. 7B, that entry (720) already contains a value, 68, located at the home address for the value 68. Therefore, a collision has occurred and the value 13 may be inserted elsewhere. In the embodiment of hash table 400, when a value cannot be inserted at an entry because of a collision, entries at addresses differing by one bit from the address of the entry may be examined. Here, the home entry (720) has address 0010 in binary. There are four binary addresses differing from this address by one bit, namely 0011, 0000, 0110, and 1010, representing 3, 0, 6, and 10 in decimal. The bottom row of search tree 700 represents these addresses of entries reachable from the home address. The search may proceed from the leftmost successor entry. In this example, the entry (725) with address 3 is vacant, and the value 13 is inserted. In addition, one or more links are added to hash table 400 to show how to reach entry (725) from the home address. In this example, a link is inserted in the home entry (720). The link indicates which bit was changed to move from one entry to the other. In this case, the one bit is different in the addresses of the two entries. Thus, the link is set to 001 in binary. This representation for links conserves space. The link requires 3 bits of space, while the address requires four bits. The space savings may be considerable for large tables. A table of a million entries may require 20 bits for storage of addresses, and 5 bits for links.

Figures 8, 9A, 9B:
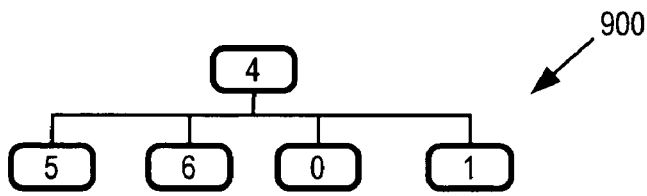

FIG. 8 represents the insertion of four additional values in the embodiment of hash table 400. Value 99 is inserted at the entry (820) with address 0, value 92 is inserted at the entry (825) with address 4, value 96 is inserted at the entry (830) with address 8, and value 109 is inserted at the entry (835) with address 10. No new links are inserted in link column 815. Each of the newly inserted values was inserted at its home address.

FIGS. 9A and 9B represent the insertion of the value 81 in the embodiment of a hash table 450. FIG. 9A depicts an embodiment of a search tree 900 for the insertion of the value. The root node of the search tree represents the home address, 4, of the value. As shown by FIG. 9B, that entry (920) already contains a value, 92, located at the home address of value 92. Therefore, the values collide and value 81 may be inserted elsewhere in the hash table. Other entries in the hash table may be searched. In the embodiments of hash table 400, those entries are the entries whose addresses differ by one bit from the home address. The addresses differing from 0100 by 1 are 0101, 0110, 0000, and 1100, respectively 5, 6, 0, and 12 in decimal. Since 12 is out of range of the table, the address is reduced by the table size (12 mod 11) to produce address 1. The bottom row of search tree 900 represents these addresses of entries reachable from the home address. The search may proceed from the leftmost successor entry. In this case, the entry with address 5 (925) is vacant. The value 81 is inserted. To show how to reach this entry (925) from the home address, a link is inserted in the home address entry (920). The link indicates which bit was changed to move from one entry to the other. In this case, the one bit is different in the addresses of the two entries. Thus, the link at entry (920) is set to 001 in binary.

Figures 10A, 10B, 11:
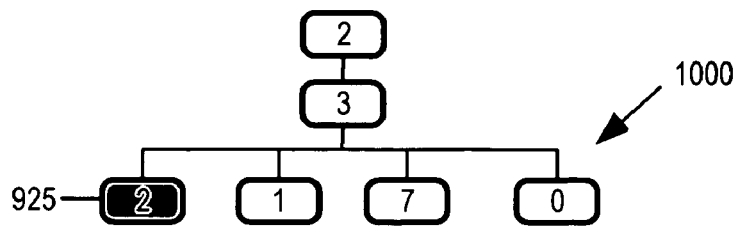

FIGS. 10A and 10B represent the insertion of the value 24 in the embodiment of a hash table 4050. FIG. 10A depicts an embodiment of a search tree 1000 for the insertion of the value. The root node of the search tree represents the home address, 2, of the value. That entry (946) already contains a value, namely 68. Other entries in the hash table may be searched for a location to store value 24. In this example, another entry is generated by following the link of entry (946) to entry (947) at address 3, represented by the middle row of search tree 1000. Since entry (947) contains a value, other entries with addresses differing by one bit from the address of entry (947) may be generated. The addresses differing from 0011 by 1 are 0010, 0001, 0111, and 1011, respectively 2, 1, 7, and 11 in decimal. Address 11 is out of range of the hash table, so it is reduced by the table length to produce address 0.

In addition, the child node (925) representing the entry with address 2 is deleted from the search tree 1000. The entry of address 2 was already visited in this search, since it is represented by the root node of search tree 1000. One procedure for keeping track of visited nodes is to create a bit vector (a vector of bits) whose length is the hash table length. The bit vector is initialized to zero. The ith bit represents the status of the entry with address i. Thereafter, whenever a node is created to represent an entry, the bit vector is checked to determine if the entry has been previously visited in this search. If so, the node is deleted. If not, the corresponding bit in the bit vector is set to 1 to record that the node has been visited in the search. Other procedures may also be used to prevent looping in the search for a location to store a value. Returning to the search for a storage location for value 24, the leftmost node on the bottom row of search tree 1000 represents entry (945) with address 1. Entry (945) with address 1 is vacant, and the value 24 is inserted there. In addition, links are set to indicate the path from the home address of value 24 to the entry (945) where the value is stored. As indicated by search tree 1000, the path was 2→3→1. The link from 2 to 3 was already set at entry (945). The link from entry (947) to entry (945) is set to 010, representing that the second bit was changed to go from binary address 0011 to binary address 0001.

FIG. 11 depicts an embodiment of hash table 400 after the insertion of the value 60. The home address of 60 is entry (995) with address 5. Although the entry with address 5 contains value 81 (see entry (948) in FIG. 10B), the value 81 is not stored in its home address. Value 81 hashes to 4. Thus, in the embodiment of FIG. 11, value 60 is inserted at entry (995) and value 81 is relocated. As the first step in the relocation, the link to value 81 from its home address, entry (994) with address 4, is reset to null. Then, a path is sought from entry (994) to one of the vacant entries. As it happens, vacant entry (998) with address 6 is reachable from entry (994). Entry (998)'s address of 0110 differs from entry (994)'s address of 0100 by only one bit, the second bit. Thus, value 81 is relocated to entry (998) with address 6. Further, the link 010, representing a difference in the second bit, is inserted at entry (994) to point to entry (998).

Figures 12A, 12B:
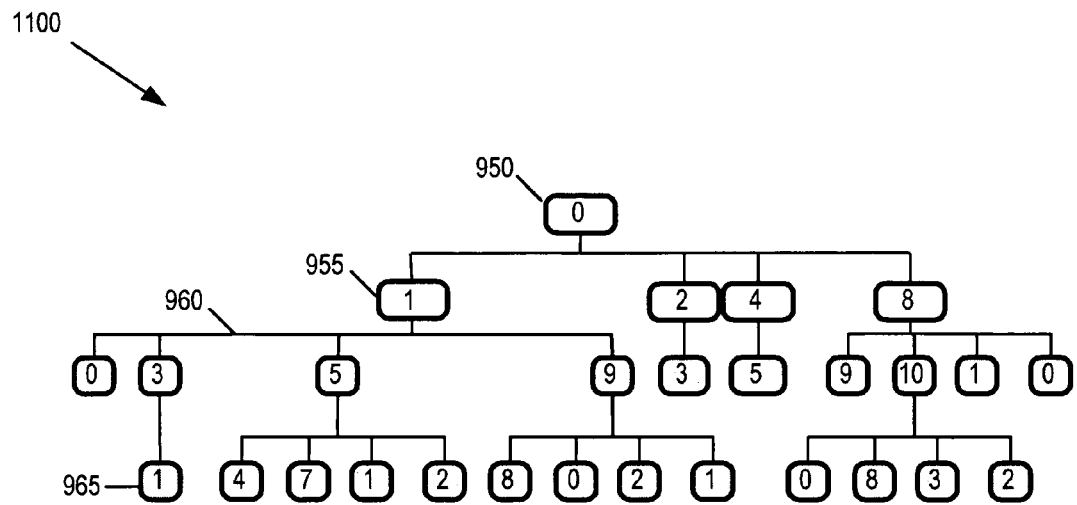

FIG. 12A and FIG. 12B represent the embodiment of a hash table 400 after the insertion of an alternative tenth value, namely the value 33 in the state of hash table 400 shown in FIG. 10B. FIG. 12A depicts an embodiment of a search tree 1100 for the insertion of the value. The root node 950 of the search tree represents the home address, 0, of the value 33. As shown by FIG. 12B, that entry (981) already contains a value, 99, with the same home address as value 33. Therefore, the two values collide, and hash table 400 may be searched for another entry to store value 33. The addresses differing by one bit from the binary representation of the address of entry (981) are generated. The addresses differing from the binary value 0000 by one bit are 0001, 0010, 0100, and 1000, respectively 1, 2, 4, and 8 in decimal. Nodes representing the entries located at those addresses are contained in the second row (955) of search tree 1100. None of those entries is available for storing value 33 as those entries all contain other values. According, entries reachable from the four entries represented in row 955 are generated. The addresses differing from 0001 binary by one bit are 0000, 0011, 0101, and 1001, representing 0, 3, 5, and 9 in decimal. Nodes representing these addresses appear in row 960 of search tree 1100. Node 0 is deleted, since it was already examined. The entries with addresses 2 and 4 have links to addresses 3 and 5 respectively. These successor nodes are deleted, because they appear to the left in row 960. Finally, from address 8, nodes 9, 10, 1, and 0 are reachable, but all are duplicates except for 10. Row 965 of search tree 1100 contains nodes representing entries reachable from the entries represented by row 960. The only new entry is at address 7, reachable from the entry at address 5. This entry is vacant. Thus, value 33 is inserted at entry (984) with address 7.

Finally, links are added to show the path from the home address of value 33, entry (981) with address 0, to entry (983) with address 7. As shown by search tree 1100, the path is 0→1→5→7. Addresses 0000 and 0001 differ in the first bit. Thus, the link at entry (981) with address 0000 pointing to entry (982) with address 0001 is 001. Addresses 0001 and 0101 differ at the third bit. Thus, the link at entry (982) with address 0001 pointing to entry (983) with address 0101 is 011. Addresses 0101 and 0111 differ at the second bit. Thus, the link at entry (983) pointing to entry (984) with address 0111 is 010. In this example, there are four entries in the path from the home address of a value to the entry where the value was stored.

In the embodiment of a hash table in FIG. 4 through FIG. 12, when a value could not be inserted at a current entry, the addresses of four additional entries to examine may be generated, when the current entry did not have a link set from the entry. Generating a plurality of new entries to examine from a current entry may reduce the length of chains in comparison to methods which generate a single new entry. Because the search is broader, the search may require fewer steps to find an entry for storage of the value. Further, the calculation of the addresses of the new entries was based upon the address of the current entry, which method may simplify the calculation. In the algorithm of the present embodiment, the calculation of new addresses was very simple, involving only the change of single bits in the address of the current entry. In alternative embodiments, other methods may be used to generate a plurality of new addresses from an address.

For further explanation, the following pseudocode provides an example of a computer program for inserting values into hash tables. This example is described as 'pseudocode' because it is an explanation presented in the general form of a computer program rather than an actual working computer program. The pseudocode consists of a main routine, bit_inversion_hashing_insert, and the subroutines insert_value_in_table, tree_search, can_add_value, generate_successors, and add_links. Each routine is followed by an explanation.

```
proc bit_inversion_hashing_insert ( )
{
Table ← initialize_table;          /* Initialize Table and link fields */
Repeat
{
x ← receive_next_value;
insert_value_in_table (x, Table)
}
end-repeat
end
}
```

The procedure bit_inversion_hashing_insert is the main routine. It initializes a hash table (line 17) and repeatedly receives a value for insertion in the hash table and inserts the value in the hash table (lines 18-23). The term "proc" in the first line indicates that the following code defines a procedure. The code of line 17 creates a hash table. A hash table is a table of entries, indexed by their addresses. Each entry has a value field and a link field. The symbol "←" in line 17 indicates assignment. The object on the left, the variable "Table" is assigned the value on the right, the hash table created by a call to the procedure initialize_table. In effect, the name "Table" is given to the newly-created hash table. Once the table is created, values are inserted. The repeat loop from lines 18 to 23 contains code to receive a value and to call the procedure "insert_$_{value}$_in_table" to insert the value in the table. The repeat loop keeps repeating this code.

```
proc insert_value_in_table (x, Table)
{
h ← Hash(x);                /* Locate the home address. */
if Table[h].value = null then
Table[h].value ← x /*home address is empty, so insert key*/
elseif Table[h].value = x then null    /* The item is a duplicate.*/
elseif Hash(Table[h].value) ≠h then /* Key already there is not in its home
address */
{relocate_old_key (table, h); /*Remove old key, its following chain, the
link that preceded it */
Table[h].value ← * x}    /* The home address is now empty, so insert new
key there */
else tree_search (x, Table)
end
}
```

The procedure insert_value_in_table inserts the value x in the hash table named Table. First, the procedure applies the hash function "hash" to x to obtain the home address h of x (line 11). Next, the procedure examines whether x may be placed at the entry of address h. The procedure looks at the entry (Table [h] represents the entry with address h of Table), and at the value of the entry (entry value represents the value field of an entry). In lines 12 and 13, if the home entry has no value (value=null), then the value x is inserted, as indicated by the assignment statement in line 13. If the value x is already stored at its home address (line 14), there is no further work to do (the null statement). If another value is already stored at address h, but the other value is not at its home address (the hash of the other value is not equal to the address h) (line 15), then the other value is relocated by calling the function relocate_$_{old}$_key (line 16), and x is inserted in the home address for x (line 18). Otherwise, if another value is stored at the home address, then there is a collision, and the tree_search routine is called to find another location for the insertion of value x in the hash table (line 19).

```
/* This part of the proc creates the tree that finds an open file slot */
proc tree_search (value, Table)
{
initialize_list_of_searched_nodes;
initialize_search_tree;
current_level ← (set-of Table[h]);
next_level ← null;
until find_vacant_space do
for node in current_level do
{
new_nodes ← generate_successors (node)
    for search_node in new_nodes do
    if can_add_value (value, search_node) then
        {add_value; set_links; return}
    else next_level ← next_level U {search_node}
    end _for
}
end-for
}
if next_level then {current_level ← next_level;
next_level ← null}
else return failure
end-until
end
}
```

The tree_search routine creates a tree to search through the hash table for an entry for insertion of the value. Starting from the entry at the home address of the value, the routine will proceed to other entries until the value can be inserted or the search ends in failure. A tree consists of nodes with links from parents to children. The top-level node is the root node. In the tree_search routine, nodes represent entries in the hash table, and a parent-child link indicates that the entry represented by the child node can be reached from the entry represented by the parent node. In the above pseudocode, two methods are used to proceed from one entry to another. The first is bit inversion. All addresses which differ from the address of the entry by one bit in binary are generated. For example, if an entry has address 1010 in binary, then the following addresses are generated:

1011, 1000, 1110, and 0010.

The second method to proceed from one entry to another is following links. If there is a link at the address 1010 to address 1111, then the entry with that address is examined next.

The tree_search routine begins with some bookkeeping operations (lines 9-12). It creates a data structure for the tree, sets the root node to the entry of the home address of the value to be inserted in the hash table, sets the nodes already examined (current_level) to the root node, and the newly-generated nodes (next_level) to none (null). Then, in a large until loop (line 13 to line 28) the routine generates entries that can be reached from the nodes in the current_level, and examines whether the value can be inserted in those entries. If so, the routine ends. Otherwise, the loop determines whether any successor nodes representing additional entries to examine were generated in the last pass (line 25). If so, the routine proceeds to the next level of tree search by setting the current_level equal to the next_level and setting the next_level to null (that is, there are not yet any nodes in the next_level). If the next_level is empty, then there were no successor nodes to the current_level, and the searched ended in failure (line 27).

The for loop (lines 14-23) looks at entries that can be reached from the current_level entries. For each entry in current_level (line 14), the routine generates the entries reachable from the entry with the call to generate_successors in line 16. The routine then checks if the value can be added in those entries (line 18). If so, the routine adds the value and sets links from the home address to the entry where the value is inserted (line 19). If not, the routine adds the newly-generated nodes to the next_level, for later examination (line 20). The nodes in next_level are a set, and the newly-generated nodes are added to them by performing a set union of the newly-generated nodes and the nodes already in the set (represented by the set-union symbol ∪).

```
proc can_add_value (value, node)
{
(node.value = null) OR (node.value = value)
end
}
```

The procedure can_add_value determines whether a value may be stored in an entry. It may be stored if the entry is vacant (the value of the entry is null) or the value is already there (the value of the entry =the value to be stored) (line 10).

```
proc generate_successors (node)
{
sucessors ← null;
if link ← node.link
then successors ← follow_link (link)
else for num ← 1 to num_bits do
{successor ← create_successor_node;
successor.address ← flip_bit (node.address, num);
successor.link ← num;
successor.parent ← node;
if not in_table_range (successor.address) then
successor.address ← successor.address modulo table_range;
if (not already_visited (successor)) then add_successor (successors)
}
end-for
end
}
```

The procedure generate_successors contains the details of going from one entry to another in the search of a hash table. The procedure follows a link if one exists (line 5). Otherwise, it generates all addresses obtainable from the address of the entry by inverting a bit in the binary representation of the address (the for loop in lines 6-15). For each bit position in the address (line 6), the for loop produces the address obtained by inverting that bit of the address (line 8). If the resulting address is outside of the table range, the address modulo the table range is used (lines 11-12). If the address has not been visited during the search, the address is added to the list of nodes to be further searched (line 13). Further, the for loop performs bookkeeping to maintain the search tree. The for loop creates a parent-child link between the old entry and new entry (line 10), and stores the position of the bit that was inverted to generate the new node (line 9).

```
proc add_links (node)
{parent ← parent (node)
while parent ≠0 /*set up all of the pseudolinks*/
do
{ifparent.link = 0 then parent.link ← node.link;
node ← parent;
parent ← parent (parent)
}
end-do
end
}
```

The add_links procedure adds links to indicate a path from the home address of a value to the entry where it is stored, using the information saved during the tree search. The procedure repeatedly sets the value of the link field at the parent entry (parent link is the value of the link field of the parent, the symbol ← represents assignment) to the link value stored in the child node (line 5). Then, the procedure moves up the tree one level from child to parent, setting the current node to the parent of the previous node (line 6) and the parent node to the parent of the previous parent (line 7).

Another embodiment of the invention is implemented as a program product for implementing a hash table manager such as hash table manager 200 illustrated in FIG 2. The program(s) of the program product defines functions of the embodiments (including the methods described herein) and can be contained on a variety of data and/or signal-bearing media. Illustrative data and/or signal-bearing media include, but are not limited to: (i) information permanently stored on non-writable storage media (e.g., read-only memory devices within a computer such as CD-ROM disks readable by a CD-ROM drive); and (ii) alterable information stored on writable storage media (e.g., floppy disks within a diskette drive or hard-disk drive). In general, the routines executed to implement the embodiments of the invention, may be part of an operating system or a specific application, component, program, module, object, or sequence of instructions. The computer program of the present invention typically is comprised of a multitude of instructions that will be translated by a computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

It will be apparent to those skilled in the art having the benefit of this disclosure that the present invention contemplates methods and arrangements to insert values in a hash table. It is understood that the form of the invention shown and described in the detailed description and the drawings are to be taken merely as examples. It is intended that the following claims be interpreted broadly to embrace all the variations of the example embodiments disclosed.

Although the present invention and some of its advantages have been described in detail for some embodiments, it should be understood that various changes, substitutions and alterations can be made herein without departing from the spirit and scope of the invention as defined by the appended claims. Although an embodiment of the invention may achieve multiple objectives, not every embodiment falling within the scope of the attached claims will achieve every objective. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method of inserting values in a hash table stored in electronic memory, the method comprising:
   determining a first address of a first entry of the hash table for a value for insertion, wherein the hash table is configured to store at most one value in each entry;
   generating a plurality of addresses of further entries of the hash table in response to determining that a stored value is stored in the first entry, the generating based upon the first address, wherein generating each of the plurality of addresses comprises:
      selecting a position of a bit of the first address; and
      changing the bit;
   inserting the value for insertion in one of the further entries, wherein an address of the one of the further entries of the hash table differs from the first address by one bit, wherein the position of the one bit in the first address is one of the selected positions; and
   inserting into a link field of the first entry a value representing a position of the bit.

2. The method of claim 1, further comprising:
   hashing a second value for insertion to determine an address of a second entry;
   determining that another stored value is stored in the second entry;
   determining that an address obtained by hashing the other stored value is not the address of the second entry;
   inserting the other stored value in a third entry of the hash table; and
   inserting the second value for insertion in the second entry.

3. The method of claim 1, further comprising:
   hashing a second value for insertion to determine an address of a second entry;
   detecting a collision of the second value for insertion with a linked value stored in the second entry;
   detecting a non-null link at the second entry; and
   following the non-null link to obtain a third entry.

4. The method of claim 1, further comprising:
   creating a tree structure to search the hash table for the one of the further entries, wherein:
      nodes of the tree structure represent the entries of the hash table;
      a root node of the nodes represents the first entry; and
      children of the root node represent at least some of the further entries; and
   pruning duplicate nodes from the tree structure.

5. The method of claim 1, wherein inserting into a link field of the first entry a value representing a position of the bit comprises inserting into a link field of the first entry a value representing the position of the bit, the value consisting of k bits, wherein k is the least integer greater or equal to $\log_2$ of the number of bits of the first address in the hash table.

6. The method of claim 1, further comprising:
   determining a second address of a second entry of the hash table for a second value for insertion;
   generating a second plurality of addresses of entries of the hash table (second set of entries), wherein generating each of the second plurality of addresses comprises;
      selecting a position of a bit of the second address; and
      changing the bit;
   determining that a value is stored in each of the second set of entries;
   selecting one of the second set of entries (selected entry);
   inserting into a link field of the first entry a value representing a position of a bit, wherein the first address and the address of the selected entry differ by the bit;
   determining an address of an entry for storing the second value for insertion, the determining comprising:
      starting with the selected entry, repeatedly generating successor entries until a vacant entry is found, wherein generating the successors of an entry comprises:
         following a link from the entry, if the entry contains a link to another entry; or
         if the entry does not contain a link to another entry, generating a plurality of addresses of the hash table of successor entries of the entry, wherein generating each of the plurality of addresses consists of:
            selecting a position of a bit of the address of the entry; and
            changing the bit; and
   inserting a series of links in entries of the hash table to indicate a path from the selected entry to the vacant entry.

7. The method of claim 1, further comprising:
   hashing a second value for insertion to determine an address of a second entry; and
   generating a plurality of addresses of further entries of the hash table in response to determining that a value is stored in the second entry, the generating of one of the plurality of addresses comprising:
      selecting a position of a bit of the address of the second entry;
      changing the bit, thereby producing the one of the plurality of addresses;
      determining that the one of the plurality of addresses is outside of an address range of the hash table; and
      generating an in-range address via the one of the plurality of addresses mod a length of the hash table.

8. The method of claim 1, wherein the generating comprises
   generating three or more addresses of further entries of the hash table.

9. An apparatus to insert values in a hash table, the apparatus
   comprising:
   memory;
   one or more processors;
   a collision analyzer module to determine a collision based upon a value for insertion and a stored value at a first address of an entry in the hash table;
   an address generator module to generate prospective addresses for storage of the value for insertion in the hash table based upon the first address, wherein the address generator module is operable to generate each of the prospective addresses, the generating consisting of:
      selecting a position of a bit of the first address; and
      changing the bit;
   storage module to store the value for insertion at one of the prospective addresses, wherein the one of the prospective addresses differs from the first address by one bit, wherein the position of the one bit in the first address is one of the selected positions; and
   a linker to insert into a link field of the entry at the first address a value representing a position of the bit.

10. The apparatus of claim 9, wherein:
   the collision analyzer module is to detect a collision of another value for insertion with a value stored in a second entry; and the address generator module is to:
   detect a non-null link at the second entry; and
   follow the non-null link to obtain a third entry.

11. The apparatus of claim 9, wherein the entry locator module further
   comprises a spanning tree generator module to:
   create a tree structure to search the hash table for the one of the further entries, wherein:
      nodes of the tree structure represent the entries of the hash table;
      a root node of the nodes represents the first entry; and
      children of the root node represent at least some of the further entries; and
   prune duplicate nodes from the tree structure.

12. A machine-readable medium containing instructions to insert values in a hash table, which when executed by a machine, cause said machine to perform operations, comprising:
   determining a first address of a first entry of the hash table for a value for insertion, wherein the hash table is configured to store at most one value in each entry;
   generating a plurality addresses of further entries of the hash table in response to determining that a stored value is stored in the first entry, the generating based upon the first address, wherein generating each of the plurality of addresses comprises:
      selecting a position of a bit of the first address; and
      changing the bit;
   inserting the value for insertion in one of the further entries, wherein an address of the one of the further entries of the hash table differs from the first address by one bit, wherein the position of the one bit in the first address is one of the selected positions; and
   inserting into a link field of the first entry a value representing a position of the bit.

13. The machine-readable medium of claim 12, wherein the operations further comprise:
   hashing a second value for insertion to determine an address of a second entry;
   determining that another stored value is stored in the second entry;
   determining that an address obtained by hashing the other stored value is not the address of the second entry;
   inserting the other stored value in a third entry of the hash table; and
   inserting the second value for insertion in the second entry.

14. The machine-readable medium of claim 12, wherein the operations further comprise:
   hashing a second value for insertion to determine an address of a second entry;
   detecting a collision of the second value for insertion with a linked value stored in the second entry;
   detecting a non-null link at the second entry; and
   following the non-null link to obtain a third entry.

15. The machine-readable medium of claim 12, wherein the operations further comprise:
   creating a tree structure to search the hash table for the one of the further entries, wherein:
      nodes of the tree structure represent the entries of the hash table;
      a root node of the nodes represents the first entry; and
      children of the root node represent at least some of the further entries; and
   pruning duplicate nodes from the tree structure.

16. The machine-readable medium of claim 12, wherein the operations comprising inserting comprise inserting into a link field of the first entry a value representing the position of the bit, the value consisting of k bits, wherein k is the least integer greater or equal to $\log_2$ of the number of bits of the first address in the hash table.

17. The machine-readable medium of claim 12, wherein the operations further comprise:
   determining a second address of a second entry of the hash table for a second value for insertion;
   generating a second plurality of addresses of entries of the hash table (second set of entries), wherein generating each of the second plurality of addresses comprises:
      selecting a position of a bit of the second address; and
      changing the bit;
   determining that a value is stored in each of the second set of entries;
   selecting one of the second set of entries (selected entry);
   inserting into a link field of the first entry a value representing a position of a bit, wherein the first address and the address of the selected entry differ by the bit;
   determining an address of an entry for storing the second value for insertion, the determining comprising:
      starting with the selected entry, repeatedly generating successor entries until a vacant entry is found, wherein generating the successors of an entry comprises:
         following a link from the entry, if the entry contains a link to another entry; or
         if the entry does not contain a link to another entry, generating a plurality of addresses of the hash table of successor entries of the entry, wherein generating each of the plurality of addresses consists of:
            selecting a position of a bit of the address of the entry; and
            changing the bit; and
   inserting a series of links in entries of the hash table to indicate a path from the selected entry to the vacant entry.

18. The machine-readable medium of claim 12, the operations further comprising
   hashing a second value for insertion to determine an address of a second entry; and
   generating a plurality of addresses of further entries of the hash table in response to determining that a value is stored in the second entry, the generating of one of the plurality of addresses comprising:
      selecting a position of a bit of the second address;
      changing the bit, thereby producing the one of the plurality of addresses;
      determining that the one of the plurality of addresses is outside of an address range of the hash table; and
   generating an in-range address via the one of the plurality of addresses mod a length of the hash table.

* * * * *